United States Patent
Hiroshi

(10) Patent No.: US 6,781,660 B2
(45) Date of Patent: Aug. 24, 2004

(54) LIQUID CRYSTAL DISPLAY

(75) Inventor: Komatsu Hiroshi, Kyungsangbuk-do (KR)

(73) Assignee: LG Philips LCD Co., Ltd., Seoul (KR)

( * ) Notice: Subject to any disclaimer, the term of this patent is extended or adjusted under 35 U.S.C. 154(b) by 229 days.

(21) Appl. No.: 09/982,830

(22) Filed: Oct. 22, 2001

(65) Prior Publication Data

US 2002/0018167 A1 Feb. 14, 2002

Related U.S. Application Data

(62) Division of application No. 09/768,241, filed on Jan. 25, 2001, now Pat. No. 6,317,183, which is a division of application No. 09/365,634, filed on Aug. 3, 1999, now Pat. No. 6,323,927, which is a continuation of application No. 08/832,980, filed on Apr. 4, 1997, now Pat. No. 5,995,186.

(30) Foreign Application Priority Data

Apr. 4, 1996 (KR) ......................................... 1996-10152

(51) Int. Cl.$^7$ ............................................. G02F 1/1343
(52) U.S. Cl. ........................................................ 349/141
(58) Field of Search ................................ 349/141, 139, 349/110, 44, 117

(56) References Cited

U.S. PATENT DOCUMENTS

| | | |
|---|---|---|
| 4,239,346 A | 12/1980 | Lloyd |
| 4,726,659 A | 2/1988 | Conrad et al. |
| 5,307,189 A | 4/1994 | Nishiki et al. |
| 5,321,535 A | 6/1994 | Ukai et al. |
| 5,459,596 A | 10/1995 | Ueda et al. |
| 5,464,669 A | 11/1995 | Kang et al. |
| 5,492,762 A | 2/1996 | Hirai et al. |
| 5,540,784 A | 7/1996 | Ranes |
| 5,576,858 A | 11/1996 | Ukai et al. |

(List continued on next page.)

FOREIGN PATENT DOCUMENTS

| | | |
|---|---|---|
| EP | 0 368 260 | 5/1990 |
| EP | 0 588 568 | 3/1994 |
| EP | 0 749 029 | 12/1996 |
| JP | 62-78532 | 4/1987 |
| JP | 04-067127 | 3/1992 |
| JP | 06-273803 | 9/1994 |
| JP | 7-36058 | 2/1995 |
| JP | 07-036058 | 2/1995 |
| JP | 07-225388 | 8/1995 |
| JP | 08-062586 | 3/1996 |

(List continued on next page.)

OTHER PUBLICATIONS

R. Kiefer, et al., *In-Plane Switching of Nematic Liquid Crystals*, Japan Display '92, pp. 547–550.

M. Oh–e, et al., *Principles and Characteristics of Electro-Optical Behaviour with In-Plane Switching Mode*, Asia Display '95, pp. 577–580.

M. Ohta, et al., *Development of Super-TFT-LCDs with In-Plane Switching Display Mode*, Asia Display '95, pp. 707–710.

(List continued on next page.)

*Primary Examiner*—Toan Ton
(74) *Attorney, Agent, or Firm*—McKenna Long & Aldridge LLP

(57) ABSTRACT

A liquid crystal display including: a first transparent substrate coated with a first alignment layer, a second transparent substrate coated with a second alignment layer, the second substrate facing the first transparent substrate, a liquid crystal layer between the substrates, a polarizer attached on the outer surfaces of the substrates, a pair of electrodes formed on the first substrates, and a driving circuit applying signal voltage to the electrodes. The liquid crystal molecules adjacent to the first substrate is rotated by applying the voltage, but, the liquid crystal molecule adjacent to the second substrate is fixed regardless of the applied voltage. The electrode pair, substantially straight data and common electrodes, are inclined at an angle with respect to a gate line.

18 Claims, 8 Drawing Sheets

U.S. PATENT DOCUMENTS

| | | | |
|---|---|---|---|
| 5,598,285 A | 1/1997 | Kondo et al. | |
| 5,600,464 A | 2/1997 | Ohe et al. | |
| 5,608,556 A | 3/1997 | Koma | |
| 5,646,705 A | 7/1997 | Higuchi et al. | |
| 5,686,019 A | 11/1997 | Nakamura | |
| 5,737,051 A | 4/1998 | Kondo et al. | |
| 5,742,369 A | 4/1998 | Mihara et al. | |
| 5,745,207 A | 4/1998 | Asada et al. | |
| 5,757,455 A | 5/1998 | Sugiyama et al. | |
| 5,760,856 A | 6/1998 | Yanagawa et al. | |
| 5,760,857 A | 6/1998 | Yanagawa et al. | |
| 5,786,876 A | 7/1998 | Ota et al. | |
| 5,793,459 A | 8/1998 | Toko | |
| 5,831,701 A | 11/1998 | Matsuyama et al. | |
| 5,841,499 A | 11/1998 | Baur et al. | |
| 5,852,485 A | 12/1998 | Shimada et al. | |
| 5,859,682 A | 1/1999 | Kim et al. | |
| 5,870,160 A | 2/1999 | Yanagawa et al. | |
| 5,886,762 A | 3/1999 | Lee et al. | |
| 5,907,380 A | 5/1999 | Lien | |
| 5,910,271 A | 6/1999 | Ohe et al. | |
| 5,914,762 A | 6/1999 | Lee et al. | |
| 5,946,067 A | 8/1999 | Kim et al. | |
| 5,956,111 A | 9/1999 | Ohta et al. | |
| 5,959,708 A | 9/1999 | Lee et al. | |
| 5,969,782 A | 10/1999 | Lee et al. | |
| 5,977,562 A | 11/1999 | Hirakata et al. | |
| 5,995,186 A | 11/1999 | Hiroshi | |
| 6,005,650 A | 12/1999 | Kim et al. | |
| 6,040,887 A | 3/2000 | Matsuyama et al. | |

FOREIGN PATENT DOCUMENTS

| | | |
|---|---|---|
| JP | 09-005763 | 1/1997 |
| JP | 09-005793 | 1/1997 |
| JP | 09-033946 | 2/1997 |
| JP | 09-043589 | 2/1997 |
| JP | 09-043590 | 2/1997 |
| JP | 09-101538 | 4/1997 |
| JP | 09-105908 | 4/1997 |
| JP | 09-105918 | 4/1997 |
| JP | 09-258269 | 10/1997 |
| JP | 09-325346 | 12/1997 |
| KR | 1994-7581 | 4/1994 |
| KR | 96-32049 | 9/1996 |
| KR | 97-22458 | 5/1997 |
| KR | 98-083765 | 12/1998 |
| WO | 97/10530 | 3/1997 |

OTHER PUBLICATIONS

S. Matsumoto, *Display Characteristics of In–Plane–Switching (IPS) LCDs and a Wide–Viewing–Angle 14.5in. IPS TFT–LCD*, Euro Display '96, pp. 445–448.

H. Wakemoto, et al., *An Advanced In–Plane–Switching Mode TFT–LCD*, SID 97 Digest, pp. 929–932.

Japanese Abstract for JP09–269507, Oct. 14, 1997.

S.H. Lee, et al., *High–Transmittance, Wide–Viewing–Angle Nematic Liquid Crystal Display Controlled Fringe–Field Switching*, Asia Display '98, pp. 371–374.

U.S. patent application Ser. No. 09/365,634, Hiroshi, filed Aug. 1999.

U.S. patent application Ser. No. 08/880,068, Hiroshi, filed Jun. 1997.

U.S. patent application Ser. No. 09/143,624, Shin et al., filed Aug. 1998.

U.S. patent application Ser. No. 09/079,894, Seo, filed May 1998.

U.S. patent application Ser. No. 09/613,730, filed Jul. 2000.

U.S. patent application Ser. No. 09/079,895, Oh, filed May 1998.

U.S. patent application Ser. No. 09/348,704, Lee et al., filed Jul. 1999.

U.S. patent application Ser. No. 09/134,405, Ham, filed Aug. 1998.

U.S. patent application Ser. No. 09/149,746, Seo, filed Sep. 1998.

U.S. patent application Ser. No. 09/235,205, Seo et al., filed Jan. 1999.

U.S. patent application Ser. No. 09/271,153, Son et al., filed Mar. 1999.

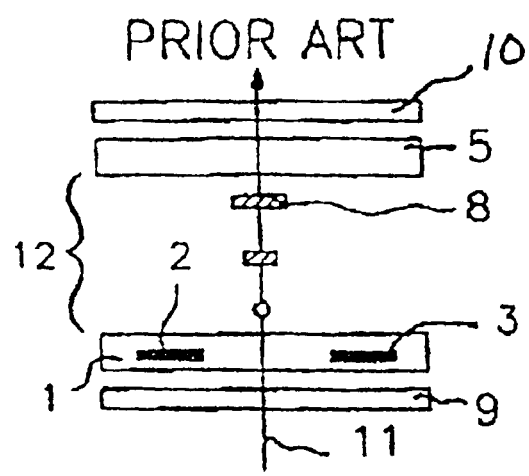
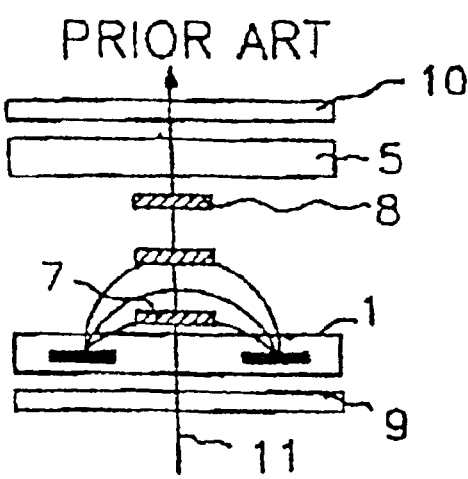
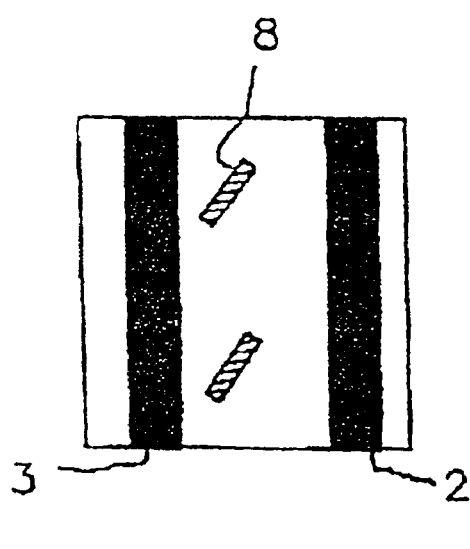
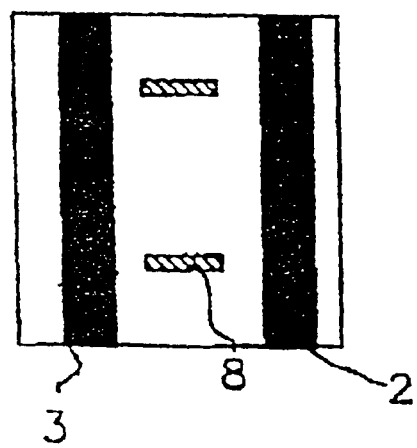

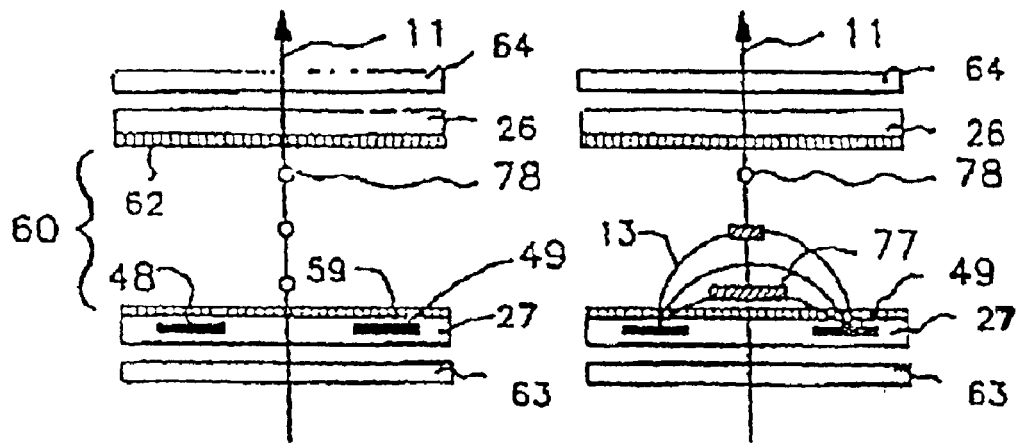
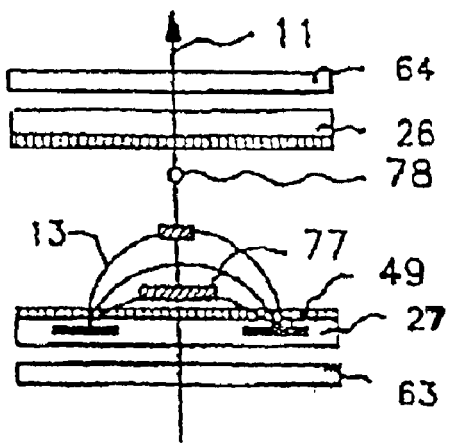
FIG.2a  FIG.2b
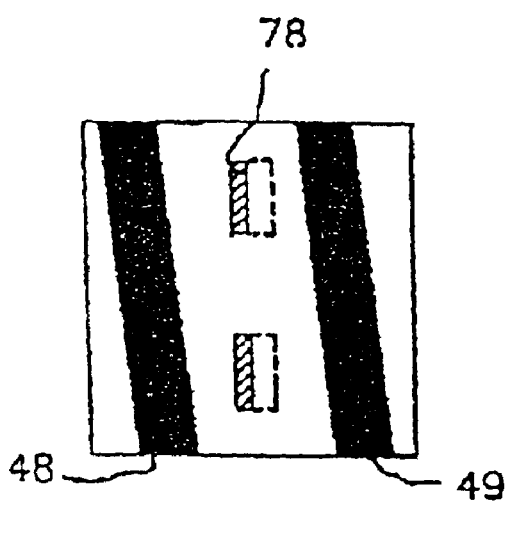
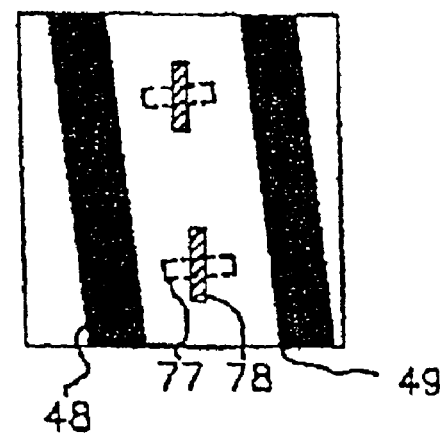
FIG.2c  FIG.2d

LIQUID CRYSTAL DISPLAY

This application is a Divisional of application Ser. No. 09/768,241 filed on Jan. 25, 2001, now U.S. Pat. No. 6,317,183 which is a Divisional of application Ser. No. 09/365,634, filed on Aug. 3, 1999, now U.S. Pat. No. 6,325,927, which is a continuation of application Ser. No. 08/832,980, filed Apr. 4, 1997 now U.S. Pat. No. 5,995,186.

This application claims the benefit of Korean Application No. 10152/1996 filed on Apr. 4, 1996, which is hereby incorporated by reference.

BACKGROUND OF THE INVENTION

1. Field of the Invention

The present invention relates to a liquid crystal display, and more particularly to an IPS(In-Plane Switching) liquid crystal display that is large in area and exhibits a wide viewing angle.

Conventional TFT LDCs (thin film transistor liquid crystal display) have a drawback known as a viewing angle dependency, that is, the contrast ratio is changed according to the viewing angle. This has made it difficult to apply the technology to a large size display.

To solve this problem, various liquid crystal displays have been proposed, such as a retardation attaching TNLCD (twisted nematic liquid crystal display) and a multi-domain liquid crystal display. The LCDs still have other technical problems such as complicated production process and shifting color tones.

2. Discussion of the Related Art

Recently, an IPS LCD has been introduced to obtain a wide viewing angle. This technology is discussed in JAPAN DISPLAY 92, p547, Japanese patent application No. 7-36058, Japanese patent application No. 7-225538, and ASIA DISPLAY 95, p707. As shown in FIG. 1a and FIG. 1c, in the liquid crystal layer 12 the molecules are aligned at a 45° angle. The principal transmittance axis of a polarizer 9 attached to the first substrate 1 is the same direction as the alignment direction of the liquid crystal 12, and the principal transmittance direction of an analyzer 10 attached to the second substrate 5 is perpendicular to the alignment direction of the liquid crystal layer 12. A pair of electrodes 2, 3 is formed on the first substrate 1.

In FIG. 1b and FIG. 1d, when the voltage is applied between two electrodes, a horizontal electric field is created. Therefore, the transmittance is controlled by causing the liquid crystal molecules to be rotated to be parallel with the electric field. When the rotation angle of the liquid crystal molecules is 45° in the normally black mode, the retardation value($\Delta$nd) is about $\lambda/2(0.21-0.36\ \mu m)$ for a maximum transmittance.

In conventional IPS LCDs as described above, the transmittance is controlled by birefringence, and a retardation film is necessary to compensate for the viewing angle which increases the manufacturing cost.

In addition, a viewing angle inverted area appears in the central portion of the outer lines of the display.

SUMMARY OF THE INVENTION

Accordingly, the present invention is directed to a liquid crystal display that substantially obviates one or more of the problems due to limitations and disadvantages of the related art.

An object of the present invention is an IPS mode liquid crystal display having a wide viewing angle and improved picture quality.

Another object of the present invention is an IPS mode liquid crystal display that can be fabricated at low cost by using a low voltage driving IC and by eliminating the need for a retardation film.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display device of the present invention includes a first substrate having a first surface and a second surface, a first alignment layer formed on the second surface of the first substrate, a second substrate having a first surface and a second surface, a second alignment layer formed on the second surface of the second substrate, a molecular liquid crystal layer between the second surface of the first substrate and the second surface of the second substrate, a pair of electrodes formed in parallel on the second surface of the first substrate, a polarizer formed on the first surface of the first substrate and having a transmittance axis, and an analyzer formed on the second surface of the second substrate and having a transmittance axis.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 1a, 1b, 1c, and 1d schematically show cross-section and plan views of a pixel of a conventional liquid crystal display;

FIGS. 2a, 2b, 2c, and 2d schematically show cross-section and plan views of a pixel of a liquid crystal display according to the present invention;

FIG. 4b shows a cross-section of the device taken along the line IV—IV of FIG. 4a;

DETAILED DESCRIPTION OF THE PREFERRED EMBODIMENTS

Figure 3:
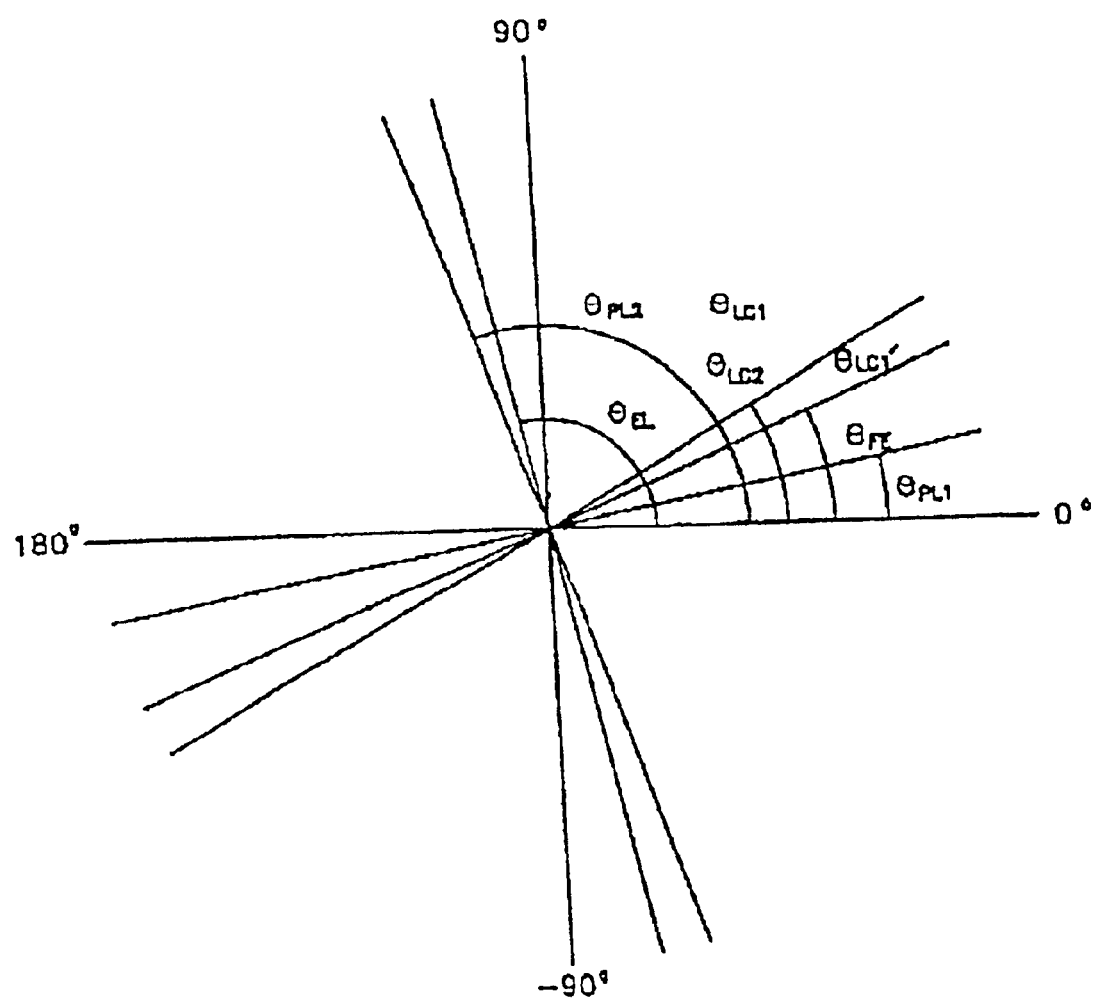
FIG. 3 shows the optical axes of the liquid crystal display according to the present invention.

Reference will now be made in detail to the preferred embodiments of the present invention, examples of which are illustrated in the accompanying drawings.

The liquid crystal display device of the present invention, as described below, comprises a first transparent substrate, a second transparent substrate facing the first transparent substrate, an alignment layer coated on the substrates, a liquid crystal layer injected between the substrates, a polarizer attached on the outer surfaces of the substrates; a pair of electrodes formed on the first substrates, and a driving circuit applying a signal voltage to the electrodes. Liquid crystal molecules adjacent to the first substrate are rotated by applying the voltage, however, liquid crystal molecules adjacent to the second substrate are fixed regardless of the applied voltage.

An embodiment of the display according to the present invention is shown in FIGS. 2a–2d. FIG. 2a and FIG. 2c are a cross-sectional view and a plan view, respectively, when a driving voltage is not applied to the display and FIGS. 2b and 2d are a cross-sectional view and a plan view, respectively, when the driving voltage is applied.

When the driving voltage is not applied, the liquid crystal molecules adjacent to the first substrate 27 are aligned with the liquid crystal molecules near the second substrate 26 as shown in FIGS. 2a and 2c. The liquid crystal molecules adjacent to the substrates are aligned by the alignment directions induced on alignment layers 59, 62.

The liquid crystal molecules 78 will be twisted between the two substrates 26, 27 by applying the driving voltage to the electrodes 48, 49. The distance between two adjacent electrodes 48, 49 is less than the thickness of the liquid crystal layer 60. The retardation value is calculated by following formula:

$$\lambda/2 < \Delta nd \leq \lambda.$$

Wherein, $\Delta n$ is the dielectric anisotrophy, d is the thickness of the liquid crystal layer, and $\lambda$ is referred as a wave length.

In addition, when the horizontal line of the liquid crystal display is 0°, the angle of the electric field($\theta_{FE}$) applied by the electrodes is according to the following formula:

$$0° < \theta_{FE} < 90°,$$

$$0° < \theta_{FE} < -\pi°$$

FIG. 3 shows optical axes of the liquid crystal display according to the present invention. $\theta_{EL}$ is represented as the extension direction of the electrodes 48 and 59, $\theta_{FE}$ is the electric field direction applied by the electrodes, $\theta_{LC1}$ is the optical axis direction of the liquid crystal molecules adjacent to the first substrate and $\theta_{LC2}$ is the optical axis direction of the liquid crystal molecules adjacent to the second substrate when the voltage is not applied. $\theta_{PL1}$ is the principal transmission axis of a polarizer, $\theta_{PL2}$ is the principal transmission axis of an analyzer, $\theta_{LC1}$ is the optical axis direction of the liquid crystal molecules adjacent to the first substrate when the voltage is applied. The alignment direction $\theta_{LC1}$ of the first substrate is anti-parallel to the alignment direction $\theta_{LC2}$ of the second substrate, and the principal transmission axis $\theta_{PL2}$ of the analyzer is parallel to the alignment direction $\theta_{LC1}$, $\theta_{LC2}$. In addition, the principle transmission axis $\theta_{PL1}$ of the polarizer is perpendicular to the principal transmission axis $\theta_{PL2}$ of the analyzer.

The extension direction of the electrodes, $\theta_{EL}$, is slightly slanted compared to the conventional extension direction which is 90° relative to the horizontal line 0° of the substrate as shown in FIG. 3.

By forming the electrodes on the slant, when the voltage is not applied, all of the liquid crystal molecules between the two alignment layers 59, 62 are aligned parallel to the substrates 26, 27 and to the principal transmission axis $\theta_{PL2}$ of analyzer. Therefore, the viewing angle inverted areas appear at the corners of the display so that the inverted phenomenon is not remarkable. The liquid crystal is nematic without the need to mix a chiral dopant. The LCD shown in FIG. 2(a) is a normally black mode because the polarizer and the analyzer are crossed and the liquid crystal molecules between them are parallel to one another.

One of the two electrodes 48 and 49 is called a data electrode and the other electrode is called a common electrode. The parallel electric field 13 is formed in the $\theta_{FE}$ direction by a signal voltage between the data electrode, e.g., electrode 48, and the common electrode, e.g., the electrode 49. The parallel electric field 13 has a maximum strength adjacent to the first substrate 27, and a minimum strength adjacent to the second substrate 26. In the middle of the liquid crystal layer 60, the parallel electric field 13 has a mean strength defined by($E_M$=($E_2$+$E_2$)/2). The electric field is weaker as the distance increases from the first substrate formed with electrodes 48 and 49. The irregularities in the electric filed can be achieved by making the thickness of the liquid crystal layer greater than the interval between two electrodes.

The liquid crystal molecules 77 adjacent to the first substrate 27 are rotated to the electric field direction $\theta_{FE}$ by the maximum electric field. The rotation angle $\theta_{RT1}$ is determined by following formula: $\theta_{RT1}=\theta_{LC1}-\theta_{LC1}'$ and the maximum rotation angle is $\theta_{LC1}-\theta_{FE}$.

The liquid crystal molecules 78 adjacent to the second substrate 26 are subject to an electric field that is below the threshold electric field so that the molecules retain the original direction $\theta_{LC2}$. In this manner, the liquid crystal molecules are continuously twisted between the two substrates 26, 27. Polarized light having a polarized direction $\theta_{PL1}$ of polarizer 63 is guided by the twisted liquid crystal molecules 60 to the perpendicular direction parallel with the principle transmittance axis $\theta_{PL2}$ of the analyzer 64. As a result, a white state is obtained by transmitting polarized light through the polarizer 63 and the analyzer 64.

The transmittance is dependent on the twisted angle on $\theta_{TW}=\theta_{LC2}-\theta_{LC1}'$ that is, the transmittance is increased in proportion to the degree of the twisted angle. A grey level of the liquid crystal display is controlled by the signal voltage inducing the liquid crystal molecules to be twisted.

To improve the viewing angle, the transmittance axis of the polarizer 63 is perpendicular to the transmittance axis of the analyzer 64 ($\theta_{PL1}$=0°, $\theta_{PL2}$32 90°), and the alignment direction $\theta_{LC1}$ of the liquid crystal molecule 77 adjacent to the first substrate 27 is anti-parallel with the alignment direction $\theta_{LC2}$ of the liquid crystal molecule 78 adjacent to the second substrate 26 ($\theta_{LC1}$=90°, $\theta_{LC2}$=−90°) In addition, the extension direction $\theta_{EL}$ is angularly offset (for example, $\theta_{EL}$=95°) from the electric field direction $\theta_{FE}$, which is in a direction perpendicular thereto (for example $\theta_{FE}$=5°) such that extensive direction $\theta_{EL}$ is slanted. The liquid crystal molecules 77 adjacent to the first substrate 27 are rotated from 90° to 5°, while the liquid crystal molecules 78 adjacent to the second substrate 26 are fixed, so that the rotation angle between the first substrate 27 and the second substrate 26 is 85°.

The retardation value And, which provides a maximum transmittance to the liquid crystal layer 60, is calculated according to the following formula: $\Delta nd=(85°/90°)\lambda=0.94$. The dielectric anisotrophy $\Delta n$ and the thickness d of the liquid crystal are appropriately arranged. The dielectric anisotrophy of the liquid crystal generally used in TN mode is 0.06–0.08, and the wave length of the light is 0.56 $\mu$m. When the values are substituted in the above formula, the thickness d should be 6.0–8.8 $\mu$m.

Figure 4A:
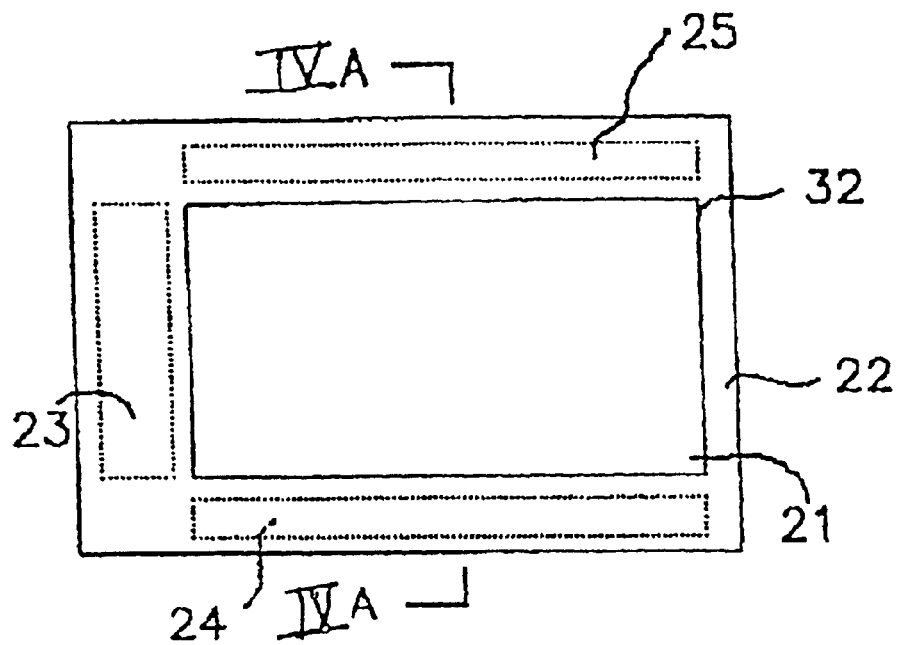
FIG. 4a shows a plan view of the liquid crystal display according to the present invention.
Figure 4B:
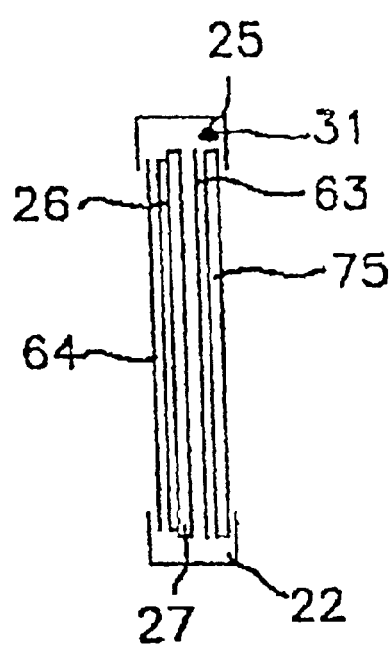

FIG. 4a shows a plan view of a liquid crystal display according to the present invention, and FIG. 4b shows a cross-sectional view taken along the line IVA—IVA of FIG. 4a. The area outside of the viewing area 21 is protected by a metal frame 22, an area deposited with a driving circuit 23 for a gate line, a driving circuit 24 for a data line, and a back light housing 25 including a back light 31. The viewing area or presentation unit 21 is shown in FIG. 4b to successively comprise a photoguide plate 75 including a photo-diffusion plate, a polarizer 63, a first substrate 27, a second substrate 26, and an analyzer 64. To compensate for the contrast ratio of the liquid crystal display, a retardation film can be deposited either between the polarizer 63 and the first substrate 27 or between the second substrate 26 and the analyzer 64.

This invention can be adopted for use with a diode mode LCD using diodes instead of TFT, or a simple matrix LCD using a simple matrix substrate, as well as the TFT mode LCD which includes the first substrate 27 formed with a thin film transistor and the second substrate 26 formed with a color filter. In addition, this invention can be adopted to monochrome type LCD or TFT mode LCD, which includes the first substrate 27 formed with a color filter and the second substrate 26 formed with a thin film transistor.

Figure 5:
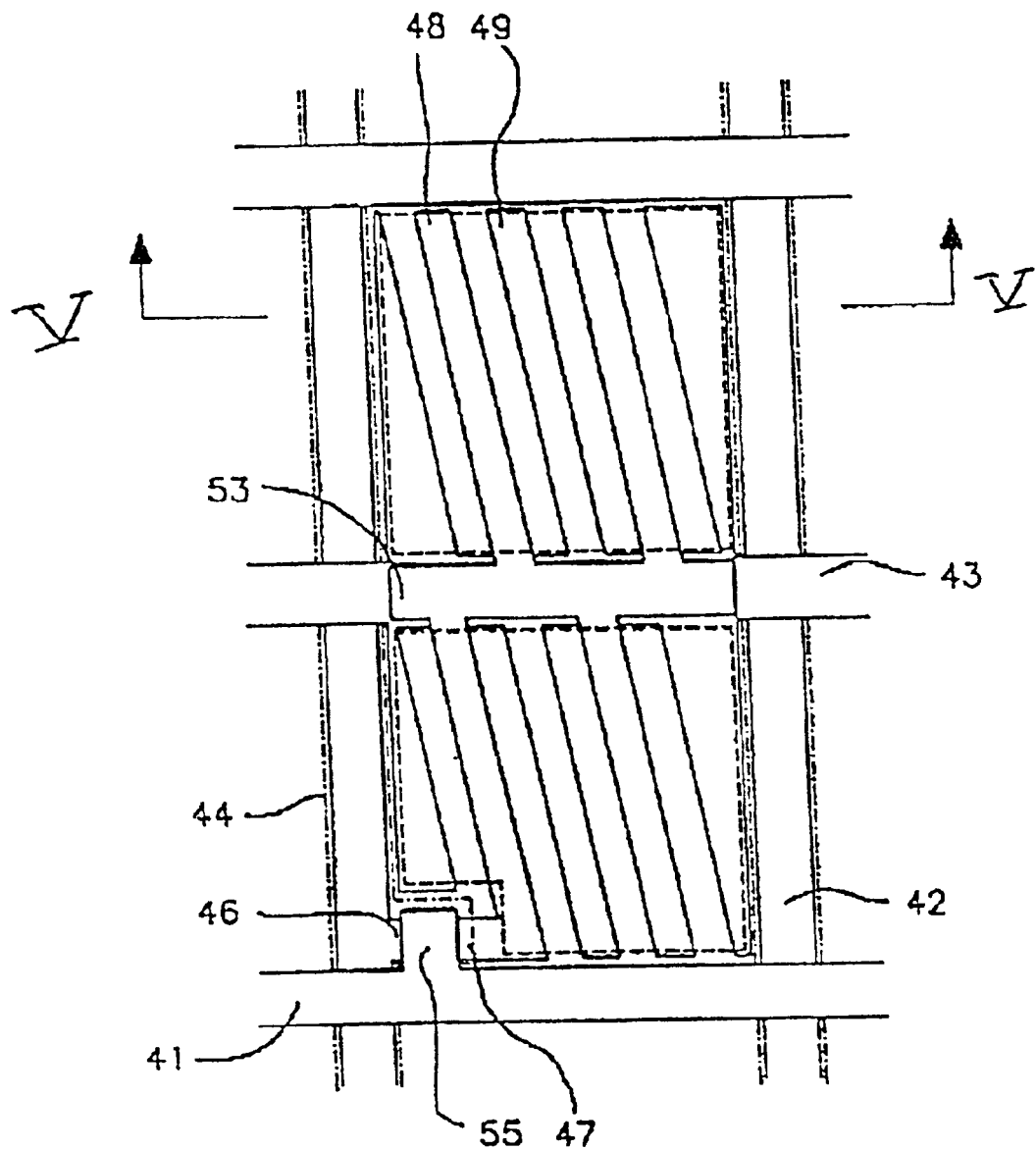
FIG. 5 shows a pixel electrode pattern according to the present invention.
Figure 6:
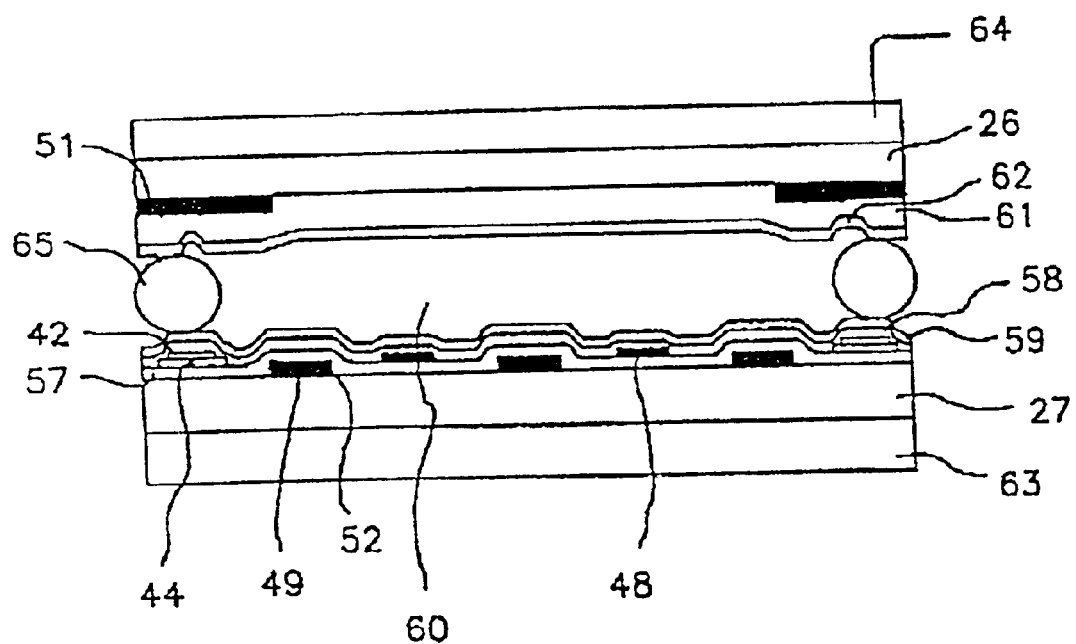
FIG. 6 shows a cross-sectional view taken along the line V—V of FIG. 5.

FIG. 5 is a plan view showing an electrode pattern for a pixel of the first substrate 27. FIG. 6 is a cross-sectional view of a liquid crystal display taken a line V—V of FIG. 5.

The liquid crystal panel is composed of two substrates 26, 27, a liquid crystal layer 60 and a spacer 65 supporting the thickness of the liquid crystal layer. The substrates 26, 27 are coated with alignment layers 62, 59 on their respective inner surfaces and attached with polarizers 64, 63 on their respective outer surfaces. TFT 55 is formed between the first substrate 27 and alignment layer 59, and a color filter 61 is formed between the second substrate 26 and the alignment layer 62.

TFT 55 is formed an the intersection of a gate line 41 and a data line 42, the gate line 41 extends horizontally (for example 0°) and the data line extends vertically (for example 90°). A common line 43 passes through the center of the pixel in a direction parallel to the gate line 41. A common electrode 49 extends from the common line 43 to the interior inside of the pixel area in a slanted direction relative to the data line 42. The data electrode 48 is provided parallel to common electrode 49 in the pixel area and is connected to a drain electrode 47 of TFT 55.

A AlTa thin layer (for example Ta content about 3%) with a thickness of about 0.3 µm thick is photo etched to pattern the gate line 41, common line 43 and common electrode 49. Then, an AlTa oxidation layer 52 is formed to a thickness of about 0.1 µm by anodizing the surface of the AlTa thin layer. Both a gate insulation thick film layer 57 of about a 0.3 µm of SiNx and an amorphous silicon (a-Si) layer 44 are patterned by a plasma chemical vapor deposition method. A Cr thin layer about 0.1 µm thick is deposited by a sputtering method and photoetched to form the data line 42, a source electrode 46, and a drain electrode 47 of the TFT 55, and the data electrode 48. The TFT 55 is completed by removing the N+ silicon layer within the channel of the TFT 55. The intersection of the common line 43 and data electrode 48 forms a storage capacitor 53, to support an electric charge (voltage) for each pixel. Finally, a SiNx passivation layer 58 (0.2 µm thickness) is deposited on the entire surface.

A black matrix 51 and a color filter 61 are formed on the second substrate 26. It is also possible to deposit an overcoat layer on the black matrix 51 and the color filter 61 to provide stability and flatness for the surface. The black matrix 51 is formed with a thin layer of width less than 10 µm, for example, 0.1 µm thick Cr/CrOx, on the area of the gate line 41, the data line 42, and common line 43 to prevent leakage of light therefrom. The color filter 61 is repeatedly formed with R,G,B layers in each pixel area.

In the above structure, the extension line $\theta_{EL}$ is disposed 95° relative to the horizontal line (0°), such that the electric filed direction $\theta_{FE}$ is 5°. The extension line is extended from the 5 µm width data electrode 48 and the 5 µm width common electrode 49, which are parallel to each other with a 5 µm space therebetween.

The alignment layers 59, 62 coated on the first and second substrates 27, 26 are obtained by coating, for example, RN1024 (produced in NISSAN CHEMICAL CO.) to a thickness of about 8 µm and baking. The alignment layer 59 coated on the first substrate 27 is rubbed in the −90° direction, and the alignment layer 62 coated on the second substrate 26 is rubbed in the 90° direction. The spacer 65 can be formed from Micropal (produced in SEKISUL FINE CHEMICAL CO.) with an exemplary 8.0 µm diameter, to maintain the liquid crystal layer 60 with a mean thickness of 7.8 µm. The liquid crystal material can be ZGS 5025 (Δn=0.067; Δ∈=6.0; produced by CHISSO CO.). The pretilt angle of the liquid crystal is 4.8°, and the retardation value Δnd is 0.41.

The principal transmittance axis of the polarizer 63 attached on the first substrate 27 is the horizontal direction ($\theta_{PL1}$=0°) and that of the analyzer 64 attached on the second substrate 26 is the vertical direction ($\theta_{PL2}$=90°).

The interval (horizontal spacing) between the data electrode 48 and common electrode 49 is less than the thickness of liquid crystal layer 60. The retardation value of the liquid crystal layer is satisfied with the following formula: $\lambda/2 < \Delta nd \leq \lambda$, wherein, $\Delta n$ is a dielectric anisotrophy of the liquid crystal, d is the thickness of the liquid crystal, and $\lambda$ is the wave length of the light.

The electric field direction is satisfied with the following formula: $0° < \theta_{FE} < 90°$.

Figure 7:
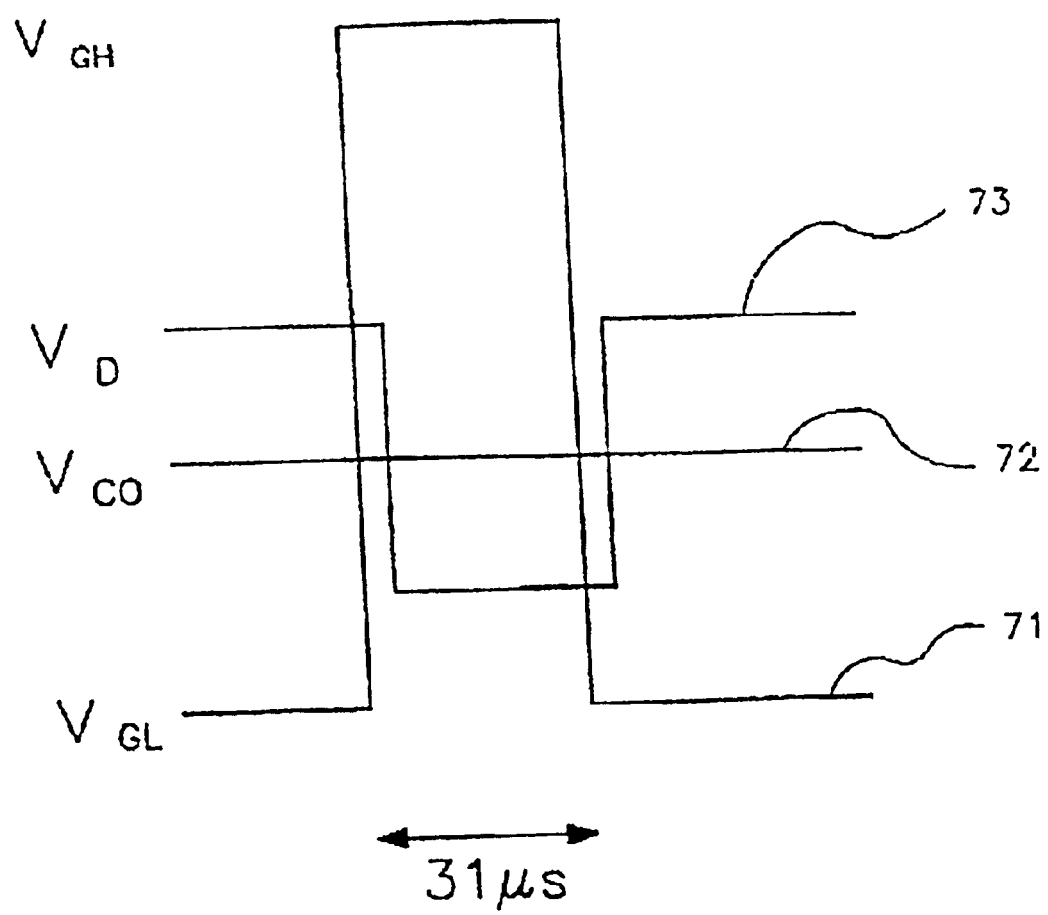
FIG. 7 shows a driving wave pattern of a TFT LCD according to the present invention.
Figure 8:
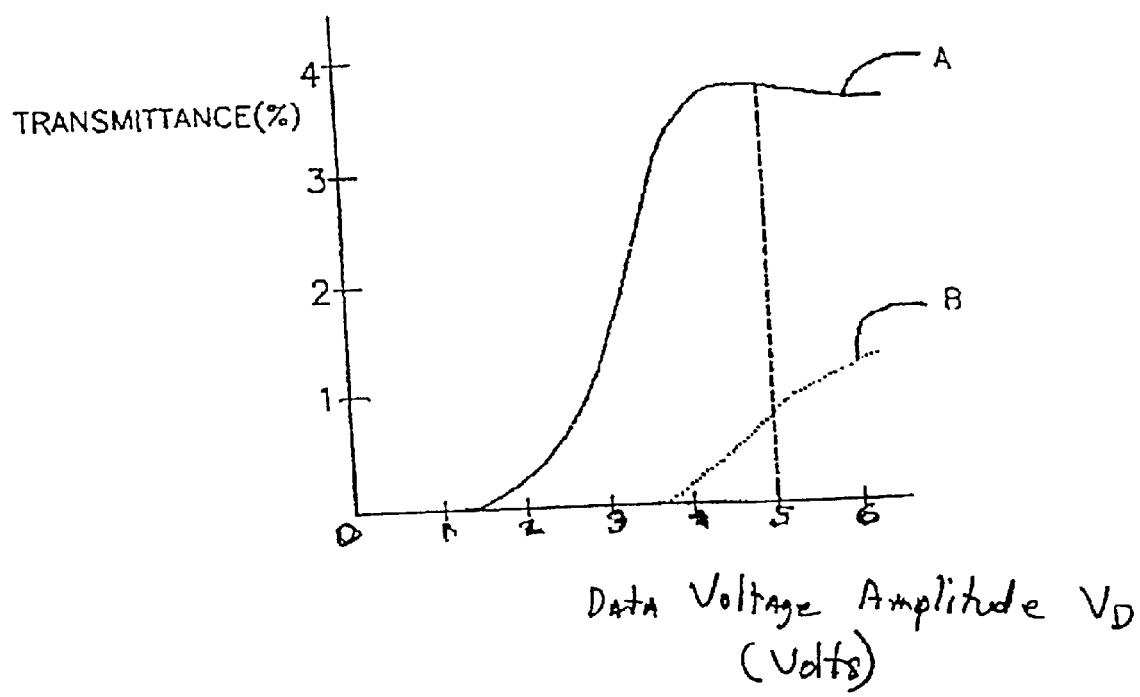
FIG. 8 shows the relationship between the wave length of data voltage and the transmittance of a TFT LCD according to the present invention.

The electro optical characteristics of the above mentioned described TFT LCD are evident with reference to FIG. 7 and FIG. 8.

FIG. 7 shows the driving voltage pulse of the LCD fabricated according to the present invention, wherein, the LCD has a 12.1 inch screen, a 480×640 (R.G.B) array of pixels. The gate voltage $V_G$ 71 is $V_{GH}$=20V, $V_{GL}$=0V, the width of the pulse=31 µs, and the common voltage $V_{CO}$ 72 is 8V direct voltage. In addition, the data voltage $V_D$ 73 is a monowave signal with a pulse width of 31 µs, of which the maximum voltage is 6V, the minimum voltage is 1V, and 5V is controlled in the signal area.

FIG. 8 is a graph showing the relationship between the amplitude of the data voltage $V_D$ and the transmittance of the liquid crystal panel. The transmittance has a maximum value of 3.6% near the 5V data voltage amplitude. The dotted line shows the transmittance of the LCD in which the interval (spacing) between two electrodes is 10 µm and the thickness of the LC layer is 6.5 µm (the interval>the thickness). The transmittance is increasing at 6V, and is ¼ of that illustrated by a solid line corresponding to the LCD of the present invention as described herein. Therefore, the LCD according to the present invention has a high transmittance despite the use of a low driving voltage.

The rotation angle of the liquid crystal layer is detected by an evaluator for LCD (produced in NIHON DENSHI CO.). The results show that the liquid crystal molecules 1 µm distant from the second substrate 26 have a optic axis of 88°, and the liquid crystal molecules 1 µm distant from to the first substrate 27 have a optic axis of 19°. It can be understood that the alignment direction of the liquid crystal molecules near the first substrate 26 is almost fixed, but the alignment direction of the liquid crystal molecules near the first substrate 27 is rotated about the anticipated angle. At this position, the anticipated angle of the liquid crystal molecules is 16. Therefore, the liquid crystal molecule is twisted in the liquid crystal layer.

The driving voltage is in the range of 1.8V–5.0V, the viewing angle is over ±70° in the vertical direction and over ±70° in the horizontal direction, wherein the contrast ratio is over 5:1. In this range, the gray level is not inverted. Accordingly, this LCD is remarkably improved in both vertical and horizontal viewing, can be used with a standard 5V driving IC, and has a front contrast ratio of 120:1.

The embodiments of the present invention have been described as having a 95° electrode extension line as an example. However, the direction can be selected according to the viewing angle characteristics that are required.

In addition, the alignment layers for the substrates need not be the same. For example, the alignment layer for the first substrate 27 can be materials that have a low anchoring energy to allow easy rotation of the adjacent liquid crystal molecules according to the applied driving voltage. The alignment layer for the second substrate 26 can be a polyamic-based material having a high anchoring energy liquid crystal molecules to inhibit rotation under the influence on applied electric field.

The present invention provides an LCD in which the data line and the common line are deposited in a slanted orientation so that the viewing angle is improved. This provides a large rotation angle for the liquid crystal molecules to permit the thickness of the liquid crystal layer to be increased, so that a standard (low voltage) driving IC can be used. In addition, a twisted nematic structure can be easily used in an IPS mode LCD without using a retardation film. Reliability is improved by using conventional twisted nematic liquid crystal.

It is to be understood that the form of the preferred embodiments of the present invention shown and described herein are to be taken as a preferred examples of the same and that various modifications and applications may be resorted to without departing from the spirit of the present invention or the scope of the appended claims.

It will be apparent to those skilled in the art that various modifications and variations can be made in the liquid crystal display of the present invention without departing from the spirit or scope of the invention. Thus, it is intended that the present invention cover the modifications and variations of this invention provided they come within the scope of the appended claims and their equivalents.

What is claimed is:

1. A liquid crystal display device having a plurality of pixels each including at least one first and second regions, comprising:

first and second substrates;
   gate and data lines on the first substrate in each first and second region;
   a common line on the first substrate in each first and second region;
   data and common electrodes on the first substrate, the data and common electrodes being formed at an angle with respect to the longitudinal direction of the gate lines; and
   a liquid crystal layer between the first and second substrates.

2. The device of claim 1, further comprising a thin film transistor at a crossing portion of the gate and data lines.

3. The device of claim 1, wherein the common line and the data electrode forms a storage capacitor.

4. The device of claim 1, wherein the common electrode is slanted relative to the data line.

5. The device of claim 1, wherein the data electrode is slanted relative to the data line.

6. The device of claim 1, wherein the common electrode is slanted relative to the gate line.

7. The device of claim 1, wherein the data electrode is slanted relative to the gate line.

8. The device of claim 1, wherein the angle is greater than 0° and less than 90°.

9. The device of claim 1, wherein the angle is about 85°.

10. The device of claim 1, wherein the angle is greater than 90° and less than 180°.

11. The device of claim 1, wherein the angle is about 95°.

12. The device of claim 1, further comprising:
   a light shielding layer on the second substrate; and
   a color filter layer on the second substrate.

13. The device of claim 12, wherein the light shielding layer includes Cr.

14. The device of claim 12, wherein the light shielding layer includes Cr/CrOx.

15. The device of claim 1, further comprising a retardation film on at least one of the first and second substrates.

16. The device of claim 1, wherein the common electrode extends from the common line.

17. A liquid crystal display device having a plurality of pixels each including at least one first and second regions, comprising:
   first and second substrates;
   data and common electrodes on the first substrate in each first and second region, with an elongation direction of the data and common electrodes being formed with respect to an longitudinal direction of an electric field direction of the data and common electrode; and
   a liquid crystal layer between the first and second substrates.

18. The device of claim 17, further comprising gate and data lines on the first substrate.

* * * * *